June 1, 1937.  E. W. SHELLER  2,082,221
STEERING WHEEL
Filed April 30, 1936
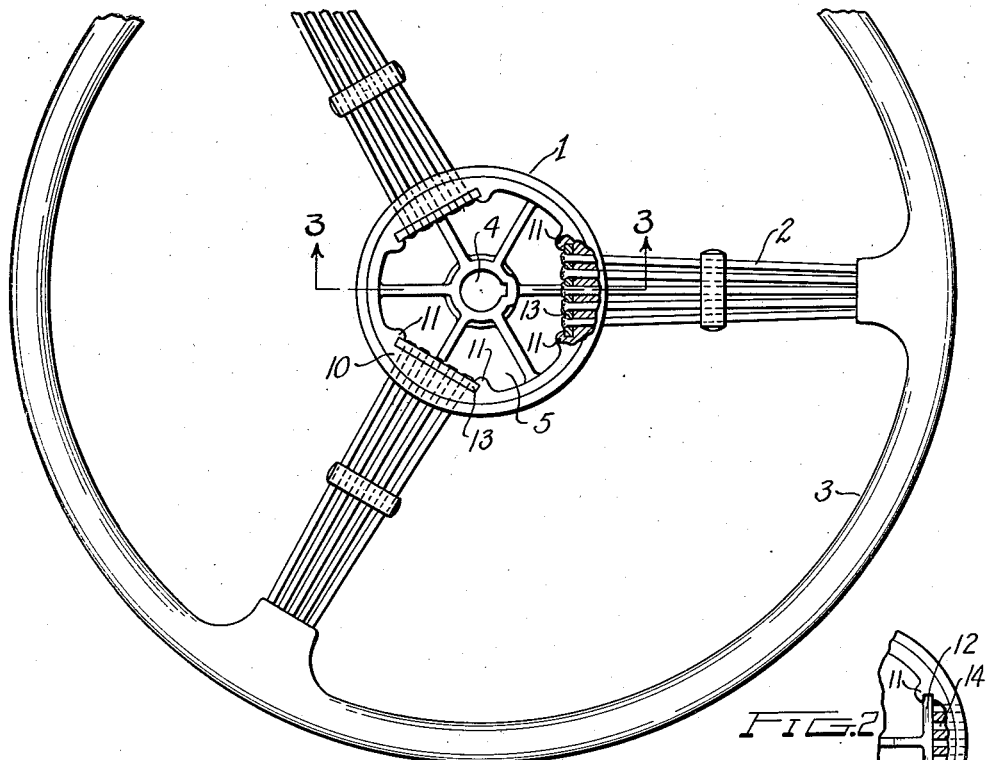
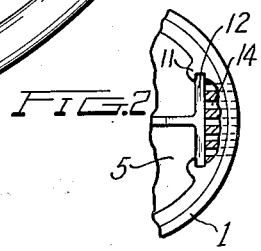
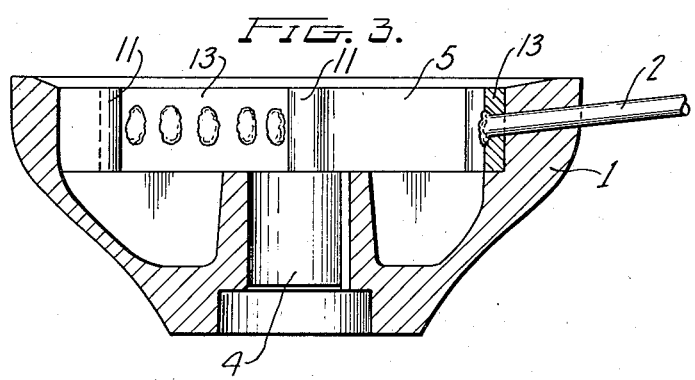
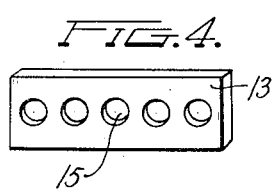
Inventor
Edward W. Sheller,
By Owen & Owen,
Attorneys.

Patented June 1, 1937

2,082,221

UNITED STATES PATENT OFFICE 2,082,221

STEERING WHEEL

Edward W. Sheller, Portland, Ind., assignor to Sheller Manufacturing Corporation, Portland, Ind., a corporation of Indiana Application April 30, 1936, Serial No. 77,128

3 Claims. (Cl. 74—552)

This invention relates to steering wheels of the type used in automobiles, and which employ cast hubs with wire spokes attached thereto.

The object of the invention is the provision of simple, economical and improved means for fixedly anchoring the inner ends of the spoke wires to the wheel hub.

The invention is fully described in the following specification, and one embodiment thereof illustrated in the accompanying drawing, in which—

Figure 1 is a plan view of a wheel embodying the invention, with parts broken away; Fig. 2 is a plan view of a portion of the hub member with a part broken away, and with the spokes and anchoring means therefor removed; Fig. 3 is an enlarged section on the line 3—3 in Fig. 1, and Fig. 4 is an enlarged perspective view of one of the spoke anchoring plates.

Referring to the drawing, 1 designates the hub, 2 the wire spoke members and 3 the rim of a hand steering wheel embodying the invention. The hub 1 is composed of a single piece of hard rigid material, preferably die cast metal, and is provided centrally with the steering post and key-receiving opening 4, the lower or bottom end of which is enlarged to receive the customary steering post. The upper end of the hub at the top of the opening 4 is provided with an enlarged co-axially disposed socket 5 for receiving the control parts and mounting therefor customarily provided on steering wheel hubs. The side wall of the socket 5, in the present instance, is provided at equi-distantly spaced intervals therearound (three in the present instance) with inwardly broadened portions 10, each having at its inner side a pair of ears or flanges 11 circumferentially spaced with respect to the hub axis and cooperating with the inner side of the respective enlargement 10 to provide an elongated recess 12 for releasably receiving a spoke anchoring plate 13. These plates, if flat as shown, are disposed tangential to a circle concentric to the hub axis.

The hub wall is drilled through each enlargement 10 to provide openings 14 to receive the inner ends of a set of spoke wires 2. Each plate 13 may have openings 15 provided therein to register with the openings 14 when the plates are positioned in the respective recesses 12, or if desired may be formed in the plates after being positioned in the recesses 12 and by the same drilling operation that forms the openings 14 in the hub.

When the inner ends of the spoke wires 2 of the different sets have been inserted through and properly positioned in the openings 14, 15, of the hub 1 and plates 13, the inner exposed ends of the spoke wires are rigidly and integrally connected to the plates 13 by electric welding, the spokes and plates for such purpose being of steel or other material suitable for such welding. It is thus apparent that the spoke wires are securely anchored to the hub against both inward and outward relative movements, due to the spokes being fixedly secured to the anchoring plates, and such plates being held by the walls of the recesses 12 against inward and outward radial movements relative to the hub.

It is found in practice that this provides a simple, efficient and inexpensive means for securing the inner ends of the wire spokes in a rigid and durable manner to a hub of the one-piece type without requiring any other means for such purpose, and that for the purpose of repair, any set of spokes and the anchoring plate therefor may be removed from the hub without disturbing the other spokes and plates.

The hub members 1 are customarily made of die casting metal which melts at a considerably lower temperature than is necessary to soften and permit an upsetting of the inner ends of the steel spokes, so that it is found necessary in practice to protect the hub metal adjacent to the points of applying a welding heat to the spokes and this is accomplished by providing the plates 13 which not only protect the hub metal in this respect but also provide a strong and durable anchoring means for the spokes.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. A steering wheel having a hub member with a control mount receiving socket in its top and with circumferentially spaced recesses in its side walls, anchoring plates in said recesses, said side wall and plates having spoke receiving openings therein, and spoke wires inserted through said openings and integrally fixed at their inner ends to the plates.

2. A steering wheel having a hub member with a control mount receiving socket in its top and with plate receiving recesses in its side walls with the recesses opening endwise of the hub, a spoke anchoring plate mounted in each recess, said side wall and plates having aligned spoke receiving openings therein, and spoke wires mounted at their inner ends in said openings and electrically welded to the respective plates.

3. A steering wheel having a hub member with an axially opening socket in one end with a plurality of circumferentially spaced plate receiving recesses in the inner face of its side wall, said recesses having overhanging side edge portions, spoke anchoring members mounted in said recesses in inter-engagement with said side edge portions, said side wall and anchoring members having aligned spoke receiving openings therein, and spoke wires mounted at their inner ends in said openings and fixed to said anchoring members.

EDWARD W. SHELLER.